Nov. 5, 1963  C. E. VANDENBERG  3,109,386
TRACK AND FOLLOWER

Filed May 13, 1957  4 Sheets-Sheet 1

INVENTOR.
CORNELIUS E. VANDENBERG
BY Thomas S. MacDonald
ATTORNEY

Nov. 5, 1963  C. E. VANDENBERG  3,109,386
TRACK AND FOLLOWER
Filed May 13, 1957  4 Sheets-Sheet 2

INVENTOR.
CORNELIUS E. VANDENBERG
BY Thomas S. MacDonald
ATTORNEY

Nov. 5, 1963   C. E. VANDENBERG   3,109,386
TRACK AND FOLLOWER

Filed May 13, 1957   4 Sheets-Sheet 3

INVENTOR.
CORNELIUS E. VANDENBERG
BY Thomas S. MacDonald

ATTORNEY

Nov. 5, 1963  C. E. VANDENBERG  3,109,386
TRACK AND FOLLOWER

Filed May 13, 1957  4 Sheets-Sheet 4

INVENTOR.
CORNELIUS E. VANDENBERG
BY Thomas S. MacDonald

ATTORNEY 3,109,386
TRACK AND FOLLOWER
Cornelius E. Vandenberg, Fullerton, Calif., assignor to
North American Aviation, Inc.
Filed May 13, 1957, Ser. No. 658,884
13 Claims. (Cl. 104—134)

This invention is directed to a new aerodynamic bearing utilizing the inherent stability of an aerodynamically shaped body when moved supersonically relative to adjacent guide walls to support that body out of contact with the walls.

Heretofore when a supersonically movable body was to be guided and/or supported by a stationary guide means, it had been thought necessary to maintain physical contact between these parts. This has been done with a resultant fritional penalty. Rollers operating on guide rails or cables, skids sliding on guide rails, and balls or rollers in bearings rolling with respect to their races, all serve to illustrate the fields in which such frictional penalties are encountered and in which the present invention may be utilized to substantially eliminate these penalties.

The term "aerodynamic shape," as used herein, is defined as a "shape which has been designed to produce a desirable low dag (as a stream-lined shape), a desirable ratio of lift-to-drag and desirable pitch, roll and yaw moment characteristics for the operating conditions in the fluid medium considered." The term "fluid medium," as used herein, is meant to include but not to be restricted to a fluid such as air, nor is any restriction to be placed upon the compressibility of the fluid.

The basic tenet of this invention represents that if an aerodynamic shape be moved supersonically through a fluid media and adjacently of properly constructed guide surfaces or tracks, that shape will be aerodynamically supported out of physical contact with the guide surfaces. The aerodynamic shape, which may be called a track follower, may then be said to "float" relative to the guide surfaces. The follower and the guide surfaces thus co-operate to form a new type of low friction bearing. This bearing may be utilized to replace the above-mentioned rollers operating on guide rails, skids sliding on guide rails, or in many instances, to replace ball or roller bearings and thus substantially eliminate a source of considerable mechanical difficulty, i.e., friction.

It is therefore an object of this invention to provide a new and improved bearing design.

It is a further object of this invention to provide an aerodynamic bearing which will substantially eliminate friction between relatively moving parts.

A still further object is to provide guide means cooperating with airfoil means for the aerodynamic support of a structural load.

Yet another object is to provide a means of support for a movable structural load while eliminating the necessity of physical contact between the load and its support means.

Another object is to provide a constant level track and follower assembly being operable over wide track tolerance ranges.

Still another object of this invention is to enable a vehicle to be guided and supported during supersonic operation without paying undue frictional penalties.

Other objects of invention will become apparent from the following description taken in connection with the accompanying drawings, in which.

Figure 1:
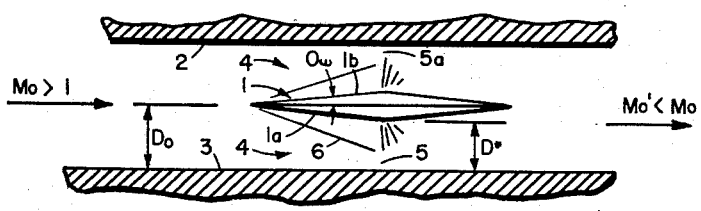
FIG. 1 is a schematic of a two-dimensional aerodynamic shape centrally located between two guide walls and illustrating the principle of this invention.
Figure 2:
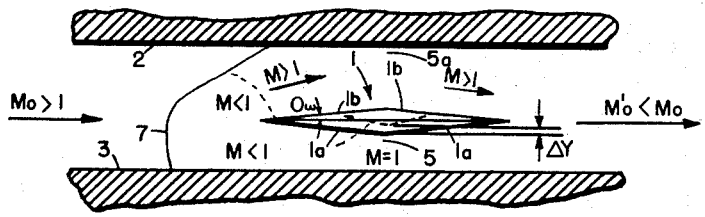
FIG. 2 is a schematic further describing the inventive principle and showing the aerodynamic shape moved off center between the guide walls.

In order that a thorough understanding of the principles of this invention might be had, a two-dimensional track follower of diamond airfoil shape situated between two walls or guide surfaces and immersed in a supersonically moving fluid stream is first considered. Because the effect of the airfoil is the same whether the air flows past a stationary airfoil or the airfoil moves through a stationary fluid mass, for convenience the former will be considered, as represented in FIG. 1 and FIG. 2. The symbols as used therein and throughout this specification are defined as follows:

$D_o$ = the distance from the airfoil leading edge to the lower wall;
$D^*$ = the distance from the airfoil to the wall at its throat;
$M$ = Mach number = the ratio of the velocity of the fluid medium relative to the wall at a particular point in the stream to the velocity of sound at that point in the stream;
$M_o$ = Free stream Mach number approaching the leading edge of the airfoil;
$M'_o$ = Free stream Mach number leaving the trailing edge of the airfoil;
$\theta_w$ = Half angle of the airfoil;
$\Delta_y$ = The amount of airfoil displacement toward the wall.

The presence, in FIG. 1, of an airfoil 1 between upper wall 2 and lower wall 3 presents a converging duct section 4 to an incoming supersonic air stream. The air stream flowing past the lower surface 1a of airfoil 1 is subject to a contraction ratio of $D_o/D^*$. If this ratio is less than that required to decelerate the flow to $M=1$ at the throat 5 (including the deceleration effects of reflected shocks off the duct walls and the effects of boundary layer buildup) and the airfoil half-angle $\theta_w$ is less than critical for the flow conditions and airfoil angle of attack, an oblique shock 6 will be maintained at the airfoil leading edge. The pressure increase along lower surface 1a will be a function of the oblique shock pattern 6 obtaining between lower airfoil surface 1a and lower duct wall 3.

FIG. 2 illustrates the aerodynamic condition which obtains as follower 1 approaches lower wall 3. The dotted line shown therein indicates the original position of airfoil 1. As the follower is displaced toward the duct wall by an amount $\Delta_y$, the new contraction ratio $D_o/D^*$, which is now equal to $D_o - \Delta_y/D^* - \Delta_y$, becomes greater than the original contraction ratio. In the limit, when $\Delta_y$ equals $D^*$, the contraction ratio $D_o/D^*$ equals infinity. When $D_o/D^*$ becomes greater than that required to obtain $M=1$ at throat 5, choking of the flow obtains, and an oblique shock can no longer be maintained at the airfoil leading edge. A normal bow shock 7 is then formed ahead of lower surface 1a, allowing spill-over past the upper surface 1b to occur. The pressures now acting along the lower surface 1a correspond to those following a normal shock, and are considerably higher than before. Further movement of airfoil 1 toward wall 3 will give an increased contraction ratio, a stronger normal shock 7 moved up-stream in the duct, and more spill-over past upper surface 1b. Static pressures along the lower surfaces will be slightly increased in spite of decreased stagnation pressures in that area resulting from increased shock intensity, the higher static pressures being required to provide for the increased spill-over flow.

At upper surfaces 1b, movement of airfoil 1 toward the lower walls 3 results in a decreased contraction ratio, a higher Mach number at throat 5a and a slightly lowered pressure recovery along upper surfaces 1b. When spill-over from surface 1a is obtained, the oblique shock originating at the leading edge of the airfoil becomes detached forwardly of the leading edge to provide sufficient volume to accommodate the spill-over mass flow. The shock wave is displaced forwardly, curving downstream along the upper surface as shown, and a small region of such air flow aft of the leading edge is obtained. Pressures immediately aft of this shock, in the subsonic portion of the flow are greater than before spill-over occurred, owing to the deceleration of the flow in this region. However, these pressures are still considerably less than those obtained along the lower surfaces 1a. This pressure force differential between the upper and lower surfaces of the airfoil acts to force the airfoil away from lower wall 3. The same effects will occur as the airfoil approaches upper wall 2, except that the forces will be oppositely applied. Thus, as the airfoil approaches either wall the described aerodynamic effects obtain and a stable position of the airfoil, out of contact with both walls, is maintained.

The effects of turning moments due to the pressure distribution over the airfoil will affect the angle of attack of the airfoil to some degree, depending upon the design of the airfoil, and upon the torsional and flexural rigidity of the airfoil and its supporting structure. The support structure design may be varied, depending upon the characteristics desired for a particular application, to give a neutral moment or a slight stalling or a diving moment. A slight stalling moment, for instance, if applied to the system when spill-over is obtained, results in an increased angle of attack of the airfoil chord line to the relative wind and even greater pressure differentials over the airfoil than before.

Figure 3:
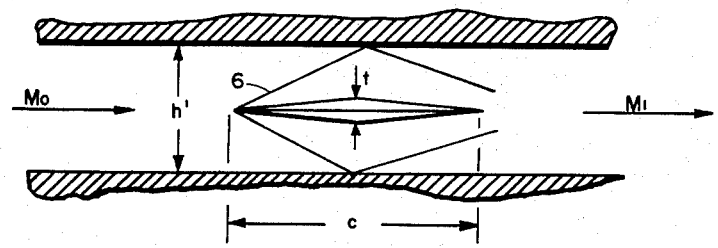
FIG. 3 is a schematic illustrating the meanings of symbols as used in the FIG. 4 graph.
Figure 4:
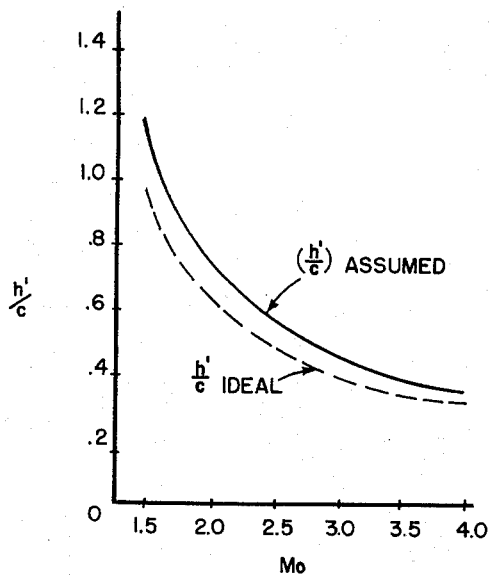
FIG. 4 is a graph comparing operation speed to the ratio of passage width to follower chord.

The chart of FIG. 4 gives an approximation of the supersonic track follower-guide wall combination design characteristics. $M_o$ is herein plotted against $h'/c$, where $h'$, as seen in FIG. 3, represents the passage width between the guide walls, which passage, allowing 20% for boundary layer thickness, etc., is calculated at 1.2 of theoretical, and $c$ represents the follower chord length. The dotted line in FIG. 4 represents an ideal of theoretical $h'/c$ condition and the solid line represents the assumed $h'/c$ condition. The chart may be utilized to determine (1) the operable speed range of a known follower and passage configuration, (2) acceptable passage widths when chord and speed are known, or (3) the chord, when passage width and speed are known. As an example, assume that an airfoil having a two foot chord is to be operated at a speed of $M=2.5$. It will be noted for $M_o=2.5$ that the $h'/c$ value between the lines runs from 0.48 to 0.58. If the value selected is 0.58, $h'$ may be found by applying the formula $h'/c=0.58$. $h'$ then equals $0.58\times2$ ft. or 1.16 ft. The maximum thickness of the follower for these calculations has been assumed as $t/c=.05$. For the 2 ft. chord represented above the thickness $(t)$ would then be .10 ft.

The above analysis has dealt only with a two-dimensional follower. The inventive principle described, however, may be extended to three-dimensional practical applications, wherein certain advantages exist. Here, the pressure buildup prior to spill-over is more gradual than in the two-dimensional case. The bow shock actually forms rearwardly of the follower leading edge and since a portion of the air mass building up rearwardly of the shock tends to slip around the sides of the follower the bow shock moves forward gradually. There are no sudden changes in aerodynamic characteristics, hence operational stability is greater and control is easier. Numerous applications utilizing the inventive principle are possible and several variations are hereinafter described.

Figure 5:
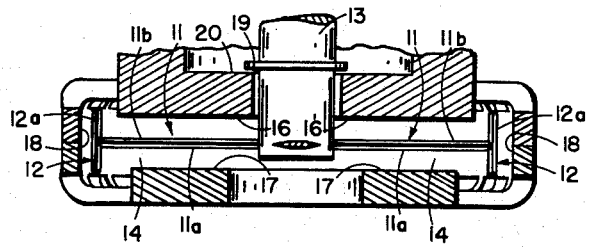
FIG. 5 is a cross sectional view of a bearing configuration utilizing the principle of this invention.

FIG. 5 serves to illustrate one configuration of this invention applied as a low friction aerodynamic bearing and is of a type which is used to replace ball or roller bearings. In FIG. 5 a plurality of aerodynamically shaped arms 11 are shown radially extending from and fixed to an axially rotatable load-carrying shaft 13. Each extension arm 11 has a lower surface 11a and an upper surface 11b and is flanked at its outer end by an aerodynamically shaped object. An airfoil 12, in this case, is shown attached substantially normal to each arm 11. Arms 11 are freely rotatable within a flat, circular cavity 14 defined between a guide wall 16 adjacently spaced from surfaces 11a and a guide wall 17 adjacently spaced from surfaces 11b. Airfoils 12 are likewise freely rotatably internally of guide wall 18 which forms the periphery of cavity 14. Outer surfaces 12a of airfoils 12 are adjacent to and spaced from said peripheral guide wall. A rotary force initially acting upon shaft 13 is subsequently transferred to airfoil shaped arms 11 and airfoils 12, driving them supersonically with respect to guide walls 16, 17 and 18. The aerodynamic effects heretofore described then serve to support arms 11 out of physical contact with walls 16 and 17 and airfoils 12 out of physical contact with wall 18. Shaft 13 and the structural load which it carries are thus supported in a virtually friction-free rotational state. Multiple banks of the described bearing may be used to provide added ability to support weight and to give shaft 13 horizontal stability. It is desirable that the cavities in which the aerodynamic shapes of this type of bearing move be confined with as little wall space as possible while still maintaining sufficient wall space for bearing operability. The resulting open area combats any tendency for the fluid medium to be accelerated with the aerodynamic shapes. Standard bearing means may be utilized to accept setructural loads during periods of supersonic bearing inoperability. In the present instance a slip ring 19 is rigidly attached to shaft 13 and adapted to bear upon shoulder 20 until the rotational speed of arms 11 is sufficient to accomplish the aerodynamic support of loads applied through shaft 13.

Other follower and guide wall shapes may be utilized in this general type of bearing construction if their characteristic shapes facilitates the aerodynamic support heretofore described. An ogival shaped follower and a matching guide wall may, for instance, be substituted for airfoil 12 and guide wall 18 of the FIG. 5 configuration.

Figure 6:
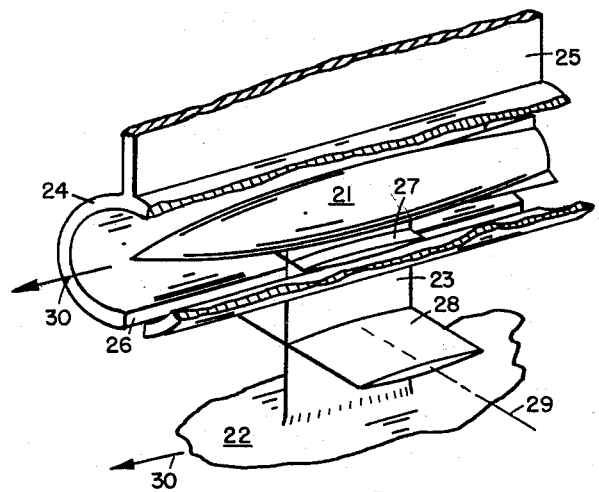
FIG. 6 is a perspective cutaway view of a vehicle support utilizing an ogival follower and a tubular wall.

FIG. 6 serves to further illustrate the principle of this invention as applied to an ogival follower surrounded by a tubular guide. An ogival follower 21 is herein axially located within a longitudinally extending tubular track member 24 which has a circular cross section. Tubular track 24 is independently and immovably supported through a support member 25 and has a slot 26 longitudinally extending along its lower surface. A structural load 22, which, for example, may be a vehicle for passenger or freight transportation, is structurally attached to follower 21 through a support arm 23. Since track 24 is immovably retained, follower 21, when moved supersonically relative to a fluid medium within said track, is aerodynamically supported in the manner heretofore described. The propulsive force required to move follower 21 is not a part of this invention and is therefore not described.

A wear plate 27 may be attached to support arm 23 interiorly of tubular track 24 and positioned to prevent follower 21 from contacting tubular track 24 during subsonic operation or stop. An airfoil 28 may be attached to support arm 23 between track 24 and vehicle 22. This airfoil may be normally positioned and movable relative to support arm 23 about an axis 29 and cotrollable to have a pitching moment.

In operation, when a propulsive force acting on vehicle 22 moves that vehicle in a direction indicated by arrows 30 the subsonic operational phase is initiated. Wear plate 27 or a similar interim support device, is at this time in contact with the internal surface of track 24 adjacently of slot 26. As the speed of vehicle 22 and all of the structure attached thereto increases, airfoil 28 is rotated clockwise about axis 29 by a standard controlling mechanism comprising, for example, a hydraulic actuating system with a power cylinder and a bell crank mechanism (not shown). This increases the airfoil angle of attack and a resultant lift of airfoil 28 with respect to the air through which it is moving is achieved. The airfoil during this operational phase will support at least a portion of the structural load thus substantially reducing frictional losses by lightening the load which must be supported by tubular track 24 through wear plate 27. When supersonic operation is achieved, follower 21, operating aerodynamically within tubular track 24, will aerodynamically support the structural load and wear plate 27 will be moved upward out of contact with track 24. Airfoil 28 may continue to support part of the load thus taking a portion of the strain from track 24. During deceleration, when the movable structure slows to subsonic speeds the operational sequence is reversed. It should be understood that any number of the described follower and track might be used in cooperation with and in any location with respect to a structural load. The load may, for example, be supported in a horizontal plane between two or more ogival bearings. Support arms 23 would in this case extend through a slot on the side rather than the bottom of tubular track 24.

Figure 7:
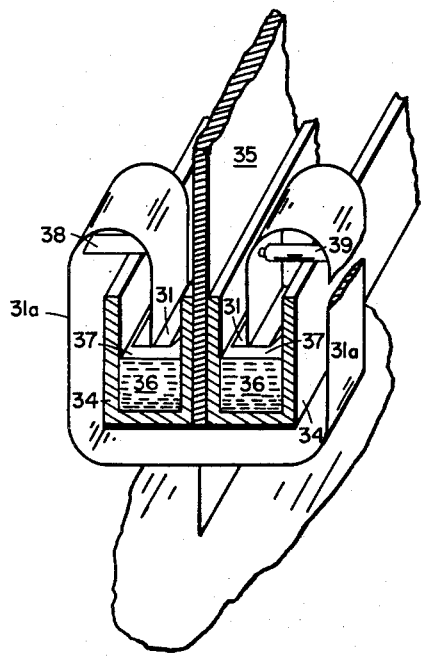
FIG. 7 is a perspective view of the invention utilizing fluid-filled troughs.

FIG. 7 illustrates an aerodynamic support assembly for a supersonically movable vehicle in a different application of the inventive principle. Herein two contiguously joined interconnecting troughs 34 containing a liquid 36 are supported by a common support member 35. An airfoil 31 having its leading edge directed longitudinally of troughs 34 is positioned above the liquid surface 37 in each trough. Rigidly attached to the top of each airfoil 31 and extending around trough 34 in an adjacent spaced relationship is an airfoil section 31a. The aerodynamic principle of this invention is then operative during relative movement between airfoil section 31a and the adjacent surfaces of trough 34 and between airfoil 31 and liquid surface 37. Airfoil 31 and airfoil section 31a are arbitrarily shown to be of biconvex cross section in this embodiment.

The placement in troughs 34 of liquid 36 achieves a highly desirable self-adjusting surface whereby vertical tolerance problems are virtually eliminated. It may be desirable in some instances to freeze liquid 36. This in no way destroys the aerodynamic effects during operation. Liquid viscosity may also be varied as desired without detrimental effects. Wear plates 38 or rollers 39, shown alternately on opposite sides of troughs 34, may be attached internally of airfoil sections 31a for subsonic operational support.

It can be appreciated that single or multiple troughs may be used dependent upon the particular design characteristics desired for specific applications.

Figure 8:
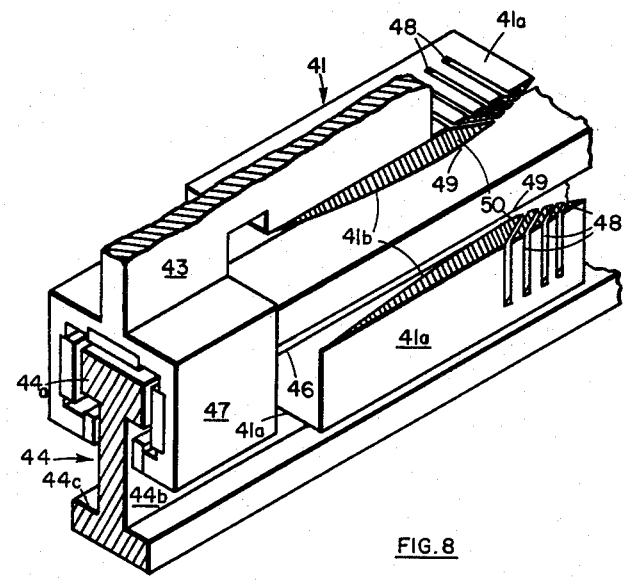
FIG. 8 shows a follower surrounding a conventional railroad rail and having a standard slipper arrangement.

FIG. 8 illustrates a modification to an existing slipper arrangement for a supersonic sled. A standard railroad rail 44 or a similarly constructed track, representing guide surfaces, is used in combination with track follower 41. Track follower 41 may be of either the rectangular cross section illustrated, a substantially oval cross section to more nearly match the contour of a standard railhead, or any desired similar shape to conform to the shape of the particular rail head used. Herein it is comprised of a plurality of airfoil sections 41a cooperatively surrounding head 44a of rail 44. Airfoil sections 41a are integrally connected at their sides to form a hollow, elongated track follower, the follower being split axially by a slot 46 which extends through the center of one of its sections. Each section 41a has an aerodynamically shaped inner surface 41b. Shank 44b of rail 44 extending through slot 46 in one of the airfoil sections rigidly joins rail head 44a to a base portion 44c. A structural support member is rigidly connected from follower 41 to a vehicle or load (not shown) to be supported. A conventional slipper or slide means 47, attached to follower 41 through support 43, surrounds rail head 44a and positions follower 41 both vertically and horizontally with respect to rail head 44a during subsonic follower operation.

It will be noted that airfoil sections 41 contain in their forward portions a series of air bleeds. These bleeds may be slots, as illustrated, perforations or similar aperture means and are provided to make the present invention more stable in operation. During certain phases of supersonic operation throat section 49, which is the minimal air passage area as defined between rail head 44a and the point of maximum thickness 50 on follower 41 tends to become choked, or overloaded, with an excess of air. This choking condition piles up a wall of air ahead of throat section 49 and can cause an unstable follower operation and high drag. Therefore the bleeds 48 have been provided so that when the throat chokes and the normal shock wave moves forward of the bleeds and higher pressure subsonic flow exists between the follower and the track at that point, the air excess is allowed to squirt out through air bleeds 48 to the lower pressure supersonic flow outside the follower thus relieving choking and allowing the follower to again achieve a stable operating characteristic.

When the track follower of FIG. 8 is used in an upright position, as shown, it becomes necessary to use a plurality of such followers with a plurality of rails in order that the structural load might be stably supported.

Figure 9:
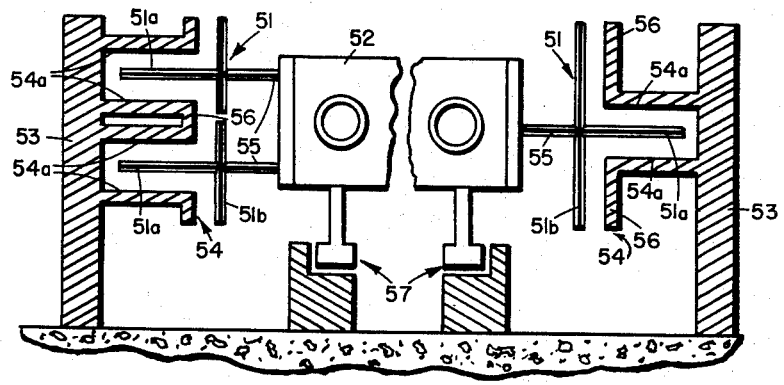
FIG. 9 is an end elevational view illustrating variations in a multiple track and follower arrangement for the support of a vehicle.

FIG. 9 illustrates a supersonically movable vehicle 52 supported by a plurality of track followers 51 operable in cooperation with tracks or guides 54. The right side shows a single follower and track while the left side shows a double arrangement. The followers are made up of a first airfoil 51a structurally fixed to support arm 55 which is connected at its opposite end to vehicle 52. A second airfoil 51b is fixedly attached to airfoil 51 at the point of its support arm attachment and at approximately a right angle with respect thereto. Track 54 is comprised of two horizontally extending, elongated, spaced plates 54a, each plate having a side rail or flange 56 extending at approximately right angles from its inner edge and away from the flange on the opposite plate. Airfoil 51a is located between and spaced from plates 54a and airfoil 51b is adjacently spaced from the internal surface of flange 56. Supports 53 or other conventional bracing methods provide structural support for tracks 54.

At least one follower and guide combination must be employed on each side of the vehicle 52, otherwise the follower would obviously be allowed to move from between plates 54a and become inoperable. However, when at least one follower is utilized on each side of the vehicle horizontal stability is maintained by the action of aerodynamic forces between airfoils 51b and flanges 56. Any desired number of followers may be employed along the length of the vehicle or in cooperation with each track. Subsonic support means 57 is provided to assure that there will at no time be physical contact between follower 51 and track 54. A conventional slipper arrangement is shown herein.

While numerous structural variations, several of which have been disclosed, might be achieved for carrying out the disclosed principle, it is the new and useful cooperation between a supersonically movable, aerodynamically shaped object and adjacently spaced guide means which is represented as being inventive. Although the invention has been described and illustrated in detail, it is clearly understood that the same is by way of illustration and example only and is not to be taken by way of limitation, the spirit and scope of this invention being limited only by the terms of the appended claims.

I claim:

1. A low friction support comprising at least one supersonically movable aerodynamic airfoil having a support face immersed in and freely supported by a fluid medium, guide surfaces situated substantially adjacent and substantially parallel to the chord of said airfoil, said airfoil being in substantially fixed angular relationship with said guide surfaces, the center portion of said support face of said airfoil being nearer the adjacent guide surface than the forward end of the airfoil, whereby the airfoil is entirely aerodynamically spaced from said guide surfaces when supersonic movement is established between said airfoil and said fluid medium.

2. A low friction support comprising the combination of at least one supersonically movable aerodynamic shape having its maximum thickness rearwardly of the front end and being affixed to a structural load, and guide surfaces situated substantially adjacent to and cooperating with said shape, said aerodynamic shape having at least one compressive surface extending rearwardly and towards one of said guide surfaces forming a throat section at the rearward end of said compression surface, said shape being in fixed angular relation to said guide surfaces, whereby said shape is entirely aerodynamically spaced from said guide surfaces when moved supersonically relative to a fluid medium located intermediately around said shape and said surfaces.

3. In combination with a structural load at least one aerodynamic bearing for the support of said load, said bearing comprising at least one independently supported guide surface, and at least one air supported free floating aerodynamically-shaped guide surface follower positioned adjacently of and in fixed angular relation with said surface and being structurally attached to said load, said follower having a forwardly facing rearwardly extending compression surface facing said guide surface, forming a throat section at the rearward end of said compression surface between said compression and guide surfaces, all of said follower being retainable in an adjacently spaced relationship from said surface by aerodynamic forces when said follower is moved supersonically.

4. In combination with a vehicle operable at supersonic speeds, means for supporting said vehicle, said means comprising a plurality of immovably positioned parallel airfoil tracks extending longitudinally in the direction the vehicle is moved and a plurality of airfoil assemblies fixedly attached to and movable with said vehicle, each of said airfoil tracks comprising a first and a second guide, each of said guides having a longtiudinally extending plate parallel to and spaced from a counterpart upon the other of said guides, longitudinally extending side rails affixed substantially at right angles to each of said plates and directed away from the other of said plates on the respective track, each of said airfoil assemblies being guidable by said airfoil tracks and comprising an airfoil positioned between and spaced from said parallel plates and having at least one of its ends extending beyond said side rails, flanking airfoils affixed to said first-mentioned airfoil at approximately right angles and extending substantially parallel to said side rails, each of said airfoils having transverse leading and trailing edges longitudinally and laterally movable with respect to said tracks, said airfoils being formed with a portion of their surfaces which face the surfaces of the respective guides and side rails being located nearer the guides and side rails by a predetermined fixed distance thereby forming throat sections between the respective surfaces, and structural support means upon said airfoil assemblies for attachment to said vehicle.

5. In combination with a vehicle movable at supersonic speeds at least one longitudinally extending track on each of two sides of said vehicle, each of said tracks being secured in an immovable position by support means attached thereto, said tracks extending parallel to each other, each of said tracks comprising two horizontally disposed, parallel, elongated spaced plates and a wall attached at right angles to said plates and co-extensive therewith, at least one track follower attached to each of said sides of said vehicle, each of said follower being operable in cooperation with a different one of said tracks respectively, each of said track followers comprising a first biconvex airfoil movable in a spaced relationship between the respective parallel plates and having a leading edge movable longitudinally of said plates, and a second airfoil rigidly fixed to and movable with said first airfoil in a parallel and spaced relationship with respect to said wall.

6. In combination, a body member and support means therefore comprising: guide wall means; said body member being adjacent to said guide means; fluid means intermediate said guide wall means and said body member adapted to move supersonically relative to said body member; surface means on said body member constructed and arranged to face and cooperate with said guide means for maintaining all of said body member a predetermined distance from said guide means when said fluid means is moved supersonically relative to said body member.

7. In combination, a body member and support means therefore situated in an aerodynamic environment comprising: stationary guide means; said body member being adjacent to said guide means; surface means on said body member cooperating with said guide means for urging all of said body member a predetermined distance away from said guide means when said body member moves supersonically relative to said guide means.

8. In combination, a body member and support means therefore comprising: guide means; said body member being adjacent to said guide means; surface means formed on said body member constructed and arranged to face said guide means for maintaining all of said body member out of contact with said guide means when said body member is moved supersonically relative to a fluid environment therearound, a fore portion of said surface means constructed and arranged to be a first predetermined distance from said guide means, an aft portion of said surface means constructed and arranged to be a second predetermined distance from said guide means, greater than said first predetermined distance, whereby pressure differentials created in said fluid environment are operative to maintain said body member out of contact with respect to said guide means during relative supersonic movements of said body member.

9. In combination, a movable member and support means therefore comprising: stationary guide means; said member adjacent to said guide means; surface means formed on said member juxtaposed to said stationary guide means and cooperating therewith for compressing a relatively moving supersonic fluid stream and for forcing all of said member away from said stationary guide means.

10. In combination, a body member and a support means therefore, said support means comprising: at least one stationary airfoil track extending longitudinally in the direction said body member is moved, said body member constructed and arranged adjacent to said support means and having airfoil means thereon, facing said airfoil track for guiding and urging all of said body member a predetermined distance away from said airfoil track when said body member moves supersonically relative to said support means, said support means further comprising guide track means formed therein for cooperating with bearing guide means formed on said body member adjacent to said guide track means for guiding said body member relative to said support means during relative subsonic movements.

11. A track and follower comprising:
  elongated stationary guide means having first and second guide portions mutually from each other spaced by an amount $h'$,
  an airframe immersed in fluid and aerodynamically supported between said portions for motion relative to the guide means and fluid at supersonic speed, said airframe having a chord length $c$ and a thickness $t$,
  said airframe and guide means being proportioned for a given Mach number $M_0$, and a selected ratio of $t/c$ to provide a ratio of $h'/c$ not less than the value $h'/c$ corresponding to said given Mach number of the graph of FIG. 4, whereby the airframe is aerodynamically stable and entirely supported aerodynamically at speeds above said Mach number.

12. In combination, a pair of track and follower assemblies each comprising:
  elongated stationary guide means having first and second guide portions mutually spaced from each other by an amount $h'$,
  an airframe immersed in fluid and aerodynamically supported between said portions for motion relative to the guide means and fluid at supersonic speed, said airframe having a chord length $c$ and a thickness $t$,
  said airframe and guide means being proportioned for a given Mach number $M_0$, and a selected ratio of $t/c$ to provide a ratio of $h'/c$ not less than the value $h'/c$ corresponding to said given Mach number of the graph of FIG. 4, whereby the airframe is aerodynamically stable and entirely supported aerodynamically at speeds above said Mach number;
  said guide means being spaced from each other,
  a vehicle supported from the airframe in each said guide means and located externally of said guide means.

13. The combination of claim 12 wherein at least one of said assemblies includes
  a second airframe fixed to said first mentioned airframe and oriented at right angles thereto,
  said guide means having normal guide portions fixed to said first mentioned portions and extending at right angles thereto in contiguity with said second airframe.

References Cited in the file of this patent

UNITED STATES PATENTS

| | | |
|---|---|---|
| 2,296,771 | Crawford | Sept. 22, 1942 |
| 2,511,979 | Goddard | June 20, 1950 |
| 2,724,966 | Northrop | Nov. 29, 1955 |
| 3,006,288 | Brown | Oct. 31, 1961 |

FOREIGN PATENTS

| | | |
|---|---|---|
| 168,415 | Austria | Sept. 25, 1951 |